United States Patent [19]
Itagaki et al.

[11] Patent Number: 5,916,090
[45] Date of Patent: Jun. 29, 1999

[54] SILICONE-BASED FOAM-SUPPRESSING COMPOSITION

[75] Inventors: Akinari Itagaki; Satoshi Kuwata, both of Gunma-ken, Japan

[73] Assignee: Shin-Etsu Chemical Co., Ltd., Japan

[21] Appl. No.: 09/105,005

[22] Filed: Jun. 26, 1998

[30] Foreign Application Priority Data

Jun. 27, 1997 [JP] Japan .................................. 9-171387

[51] Int. Cl.$^6$ ...................................................... A23L 1/00
[52] U.S. Cl. ............................................................ 516/117
[58] Field of Search .............................................. 516/117

[56] References Cited

U.S. PATENT DOCUMENTS

| | | | |
|---|---|---|---|
| 4,690,713 | 9/1987 | Terae et al. | 516/117 |
| 4,983,316 | 1/1991 | Starch | 516/117 |
| 5,153,258 | 10/1992 | Nakahara et al. | 516/117 |
| 5,486,306 | 1/1996 | L'Hostis et al. | 516/117 |
| 5,556,902 | 9/1996 | Shouji et al. | 516/117 |
| 5,693,256 | 12/1997 | Sawicki et al. | 516/117 |

*Primary Examiner*—Paul F. Shaver
*Attorney, Agent, or Firm*—Millen, White, Zelano, & Branigan, P.C.

[57] ABSTRACT

Provided by the invention is a silicone-based oil compound as a base of a defoaming agent of, for example, an emulsion type in an aqueous medium containing a surface active agent capable of exhibiting excellent sustainability of the defoaming activity and stability against dilution. The oil compound comprises (A) from 30 to 98.9% by weight of an $\alpha,\omega$-dihydroxy dimethyl polysiloxane, (B) from 0.1 to 20% by weight of a poly(methyl hydroxy siloxane, such as 1,1,1,3,5,7,7,7-octamethyl-3,5-dihydroxy tetrasiloxane and (C) from 1 to 50% by weight of a finely divided silica powder having a specific surface area of at least 100 m$^2$/g.

17 Claims, No Drawings

SILICONE-BASED FOAM-SUPPRESSING COMPOSITION

BACKGROUND OF THE INVENTION

The present invention relates to a foam-suppressing composition or, more particularly, to a novel silicone-based foam-suppressing composition in the form of an oil compound suitable for use in various kinds of foaming systems even under vigorous agitation.

It is a well established technology that silicone-based foam-suppressing compositions or defoaming agents are widely used for reducing disadvantages caused by foaming in an aqueous system in a variety of industrial fields including chemical industries, food industries, petroleum industries, fabric industries and pharmaceutical industries by virtue of their excellent defoaming activity as compared with defoaming agents of other types. Silicone-based defoaming agents are used in the form of an oil compound prepared by blending a silicone oil, such as a dimethyl polysiloxane, methyl phenyl polysiloxane and methyl vinyl polysiloxane, and a finely divided silica powder or in the form of an aqueous emulsion obtained by dispersing and emulsifying the above mentioned oil compound in an aqueous medium containing a surface active agent as an emulsifying agent. A problem in such an emulsion-type silicone-based defoaming agent is that the defoaming activity thereof is greatly decreased when the aqueous foaming liquid is at a high temperature, when the aqueous foaming liquid is strongly alkaline or when the foaming liquid is under vigorous agitation with a strong shearing force because the emulsion of the defoaming agent is destroyed under these adverse conditions. As a remedy for this problem, a proposal is made in Japanese Patent Publications 52-19836, 52-22638 and 55-23084 for a self-emulsifiable defoaming agent by the combined use of a silicone-based oil compound and an organopolysiloxane modified by polyoxyalkylene groups, which is suitable for use in dyeing processes of fabric materials and as an additive in various kinds of oiling agents and water-base inks.

The above mentioned improved silicone-based defoaming agents, however, are still not quite satisfactory due to the relatively low sustainability of the defoaming activity thereof especially when the defoaming agent is brought violently into contact with the foaming gas in a foaming liquid under vigorous agitation or when the foaming liquid is at a high temperature as is sometimes the case in the dyeing process of fabric materials. This problem can be solved only by increasing the amount of the defoaming agent added to the foaming liquid or by supplementarily adding the defoaming agent in portions to compensate the decrease in the defoaming activity.

In view of the above described problems, other measures for the improvement of a silicone-based defoaming agent are proposed In Japanese Patent Publication 52-31836 according to which the silica powder compounded in an oil compound is rendered hydrophobic beforehand by a treatment with an organosilane compound such as dimethyl dichlorosilane and in Japanese Patent Publication 51-35556 according to which the silica powder is treated with a nitrogen-containing organosilicon compound such as hexamethyl disilazane. These methods are, however, not practical due to the lengthy treatment time for the hydrophobilizing treatment of the silica powder and complexity of the process as well as the costs for the apparatuses used in the hydrophobilizing treatment of the silica powder.

Further, Japanese Patent Kokai 57-48307 discloses a silicone-based defoaming agent which comprises an organopolysiloxane or a hydrocarbon compound with admixture of an organohydrogen polysiloxane, a silica powder and an organometallic compound as a catalyst. Such a composition is disadvantageous because the preparation procedure thereof involves a heat treatment of the composition after admixture of the catalyst in order to promote the surface treatment of the silica particles as well as a danger of explosion due to evolution of hydrogen gas. Japanese Patent Publication 3-39722 discloses a method in which an organopolysiloxane is admixed with an organosilicon compound and a catalyst and then subjected to a heat treatment. U.S. Pat. No. 4,486,336 discloses a defoaming agent comprising an organopolysiloxane, a silica powder and an organopolysiloxane resin consisting of $(CH_3)_3SiO_{1/2}$ units and $SiO_{4/2}$ units. Japanese Patent Kokai 6-154513 discloses a method in which the silica powder as an ingredient of a defoaming agent is subjected to a treatment with a cyclic organosiloxane oligomer and a mixture of water and a reaction promoter. These methods or defoaming agents are, however, still not quite satisfactory in respect of the sustainability of the defoaming activity.

The inventors have continued extensive investigations with an object to obtain a silicone-based defoaming agent capable of exhibiting high defoaming activity with sustainability even at a high temperature and under a high shearing force. They have made several proposals including a method for the preparation of a defoaming agent in which an organopolysiloxane is compounded with a silica powder after a hydrophobilizing treatment and an inorganic ammonium salt and subjected to a heat treatment (Japanese Patent Publication 4-42043), an oil compound as a defoaming agent comprising a silicone oil having branched organosiloxane units and a silica powder (Japanese Patent Kokai 6-142411) and a method for the preparation of a defoaming agent in which an organopolysiloxane is compounded with a silica powder and a dispersing aid which is an inorganic or organic acid and subjected to a heat treatment. These proposals are in fact effective in obtaining a silicone-based defoaming agent having excellent sustainability of the defoaming activity but it is still desirable to develop a defoaming agent with further improvements in respect of the stability of the emulsion by dilution and under a strong mechanical shearing force.

SUMMARY OF THE INVENTION

The present invention has an object to provide a novel and improved silicone-based foam-suppressing composition or defoaming agent with which the above described problems and disadvantages in the prior art defoaming agents can be overcome.

Thus, the present invention provides a silicone-based oil compound suitable as the principal constituent of a defoaming agent which comprises, as a uniform blend:

(A) from 30 to 98.9% by weight of an α,ω-dihydroxy diorganopolysiloxane having a viscosity in the range from 10 to 1,000,000 centistokes at 25° C. represented by the general formula

in which each R is, independently from the others, an unsubstituted or substituted monovalent hydrocarbon group having 1 to 20 carbon atoms and the subscript m is a positive number having an average value in the range from 10 to 3000;

(B) from 0.1 to 20% by weight of a poly(organohydroxy siloxane) represented by the general formula

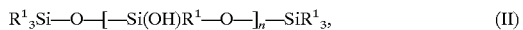
(II)

in which each $R^1$ is, independently from the others, an unsubstituted or substituted monovalent hydrocarbon group having 1 to 20 carbon atoms and the subscript n is a positive integer in the range from 1 to 10; and (C) from 1 to 50% by weight of a finely divided silica powder having a specific surface area of at least 100 $m^2/g$, the total amount of the components (A), (B) and (C) being 100% by weight.

DETAILED DESCRIPTION OF THE PREFERRED EMBODIMENTS

As is described above, the silicone constituent in the defoaming composition of the present invention consists of two organopolysiloxanes including a diorganopolysiloxane terminated at each molecular chain end with a silanolic hydroxyl group as represented by the general formula (I) and an oligomeric poly(organohydroxy siloxane) represented by the general formula (II). By virtue of the formulation with these hydroxyl-containing organopolysiloxanes, an improvement can be obtained in the affinity between the silica particles and the silicone oil contituent so that good stability of the dispersion can be accomplished and the viscosity or consistency of the oil compound is relatively low to ensure good workability in the use thereof. Accordingly, the oil compound as such can be used as a defoaming agent or can be used as an intermediate in the preparation of a defoaming agent in the form of an emulsion with the aid of a surface active agent or of the self-emulsifiable defoaming agent to exhibit excellent sustainability of the defoaming activity and stability in mechanical working and dilution in addition to the high sustainability of the defoaming activity.

The above described defoaming oil compound is economically advantageous because the formulation does not include any expensive hydrophobic silica powder and the composition can be prepared by merely blending the components and subjecting the blend to a heat treatment without using any special apparatuses and without a risk of danger against safety of workers.

The component (A) as the principal silicone constituent in the inventive silicone oil compound is an α,ω-dihydroxy diorganopolysiloxane represented by the general formula (I) given above. In the formula (I), each of the groups denoted by R is, independently from the others, a monovalent hydrocarbon group having 1 to 20 carbon atoms exemplified by alkyl groups such as methyl, ethyl, propyl, butyl, pentyl, hexyl, heptyl, octyl, nonyl, decyl, dodecyl, tetradecyl, hexadecyl and octadecyl groups, cycloalkyl groups such as cyclohexyl group, alkenyl groups such as vinyl and allyl groups, aryl groups such as phenyl, tolyl and naphthyl groups and aralkyl groups such as 2-phenylethyl and 2-methyl-2-phenylethyl groups as well as substituted monovalent hydrocarbon groups obtained by replacing a part or all of the hydrogen atoms in the above named hydrocarbon groups with halogen atoms, cyano groups, amino groups, mercapto groups, epoxy groups and/or (meth) acryloxy groups such as chloromethyl, 3,3,3-trifluoropropyl, 2-cyanoethyl, N-2-(aminoethyl)-3-aminopropyl, 3-aminopropyl, 3-mercaptopropyl, 3-glycidoxypropyl, 3-acryloxypropyl and 3-methacryloxypropyl groups. It is preferable from the standpoint of economy and defoaming activity of the defoaming agent that all or at least 90% of the groups denoted by R in the component (A) are methyl groups, the balance, if any, being phenyl groups. The subscript m in the general formula (I) is a positive number having an average value in the range from 10 to 3000 or, preferably, from 50 to 1000 or, more preferably, from 150 to 500. The diorganopolysioxane as the component (A) should have a viscosity at 25° C. in the range from 10 to 1,000,000 centistokes or, preferably, from 100 to 100,000 centistokes or, more preferably, from 500 to 10,000 centistokes. When the viscosity of the component (A) is too low, the solubility of the diorganopolysiloxane in the foaming liquid is increased to adversely affect the defoaming activity of the defoaming agent prepared therewith while, when the viscosity of the diorganopolysiloxane is too high, difficulties are encountered in the preparation of an oil compound along with a decrease in the workability in the use of the defoaming agent prepared therewith.

The weight fraction of the component (A) in the oil compound consisting of the components (A), (B) and (C) is in the range from 30 to 98.9% by weight or, preferably, from 50 to 95% by weight or, more preferably, from 70 to 90% by weight. When the amount of the component (A) is too small, the consistency of the oil compound prepared from the components (A), (B) and (C) is too high to cause a decrease in the workability by using the oil compound while, when the amount of the component (A) is too large, the weight fraction of the finely divided silica powder as the component (C) is necessarily too low so that the oil compound cannot exhibit high defoaming activity.

The component (B) is a poly(organohydroxy siloxane) represented by the general formula (II) given above, in which the symbol $R^1$ has the same meaning as defined for R in the general formula (I). It is preferable that all or at least 90% of the groups denoted by $R^1$ in the component (B) are methyl groups, the balance, if any, being phenyl groups, from the standpoint of economy and obtaining good defoaming activity of the defoaming composition. The subscript n in the general formula (II) is a positive integer in the range from 1 to 10 or, preferably, from 2 to 5. More preferably, n has a value of 2.

The poly(organohydroxy siloxane) as the component (B) compounded in the inventive defoaming agent serves to improve the affinity between the diorganopolysiloxane as the component (A) and the finely divided silica particles as the component (C) so that improvements can be accomplished in the defoaming activity, sustainability of the defoaming activity and stability of the composition against dilution. The weight fraction of the component (B) in the inventive defoaming agent is in the range from 0.1 to 20% or, preferably, from 1 to 10% or, more preferably, from 2 to 7%. When the amount thereof is too small, the above mentioned advantageous effects cannot be fully exhibited as a matter of course while, when the amount is too large, an undue increase is caused in the consistency of the silicone oil compound and decrease in the stability of the defoaming agent prepared from the oil compound.

The component (C) is a finely divided silica powder which can be selected without particular limitations from known silica powders including precipitated and fumed silica powders as well as so-called silica xerogels. These silica powders can optionally be treated beforehand with an organosilyl group-containing compound for hydrophobilization. Various grades of commercial silica powder products are available on the market including those sold under the trade names of Aerosils by Nippon Aerosil Co., Nipsils by Nippon Silica Co., Silysias by Fuji Silysia Co., Finesils by Tokuyama Co., Mizukasils by Mizusawa Chemical Co., Cab-O-Sils by Cabot Corp. and Santocels by Monsanto Co. It is essential that the silica powder has a specific surface area of at least 100 m²/g or, desirably, at least 200 m²/g as determined by the BET method. The silica powder as the component (C) should have a specific surface area as large as possible in order to obtain an improvement in the defoaming activity of the defoaming composition.

The weight fraction of the finely divided silica powder as the component (C) is in the range from 1 to 50% or, preferably, from 5 to 30% by weight or, more preferably, from 8 to 15% by weight. When the amount of the silica powder is too small, the defoaming agent cannot have sufficiently high defoaming activity while, when the amount thereof is too large, the consistency of the composition is unduly increased adversely affecting the dispersibility of the composition in water and working efficiency.

The preparation procedure of the inventive silicone oil compound is as follows. Thus, the above described components (A), (B) and (C) are taken each in a specified amount in a mixing machine equipped with a suitable stirrer and heated therein under mixing for 1 to 8 hours at 60 to 200° C. or, preferably, for 2 to 5 hours at 100 to 150° C. so that a uniform silicone oil compound having a viscosity of several tens of centistokes to several millions of centistokes at 25° C. is readily obtained. The thus obtained oil compound can be added as such to a foaming liquid as a defoaming agent but it is preferable that the oil compound is converted into a self-emulsifiable defoaming agent by blending with a surface active agent before addition to a foaming liquid as a defoaming agent so that further improvement can be obtained in the sustainability of the defoaming activity under a high shearing force. It is of course optional depending on the desired application of the defoaming agent that the oil compound is emulsified in an aqueous medium containing a suitable surface active agent to give a defoaming emulsion composition to be added to an aqueous foaming liquid.

Though not particularly limitative, examples of the above mentioned surface active agent to serve as an emulsifying agent include sorbitan fatty acid esters, glycerin fatty acid esters, propyleneglycol fatty acid esters, polyoxyethylene fatty acid esters, polyoxyethylene sorbitan fatty acid esters, polyoxyethylene alkyl ethers and polyoxyalkylene polymers. The defoaming composition in the form of an aqueous emulsion can optionally be admixed with a water-soluble polymer including cellulose ethers such as methyl cellulose, carboxymethyl cellulose and carboxyethyl cellulose, polyvinyl alcohol, sodium alginate, saccharose fatty acid esters and poly(sodium acrylate) to serve as a proective colloid working in the course of emulsification, thickening agent or stability improver and sodium hypochlorite, sorbic acid, potassium sorbate, salicylic acid, benzoic acid, alkyl paraoxybenzoates and organic nitrogen-sulfur compounds to serve as an antiseptic agent or germicidal agent.

Further, the silicone oil compound of the invention can be used as a defoaming agent in the form of an organic solution or dispersion prepared by dissolving or dispersing the oil compound in a suitable organic solvent such as aliphatic hydrocarbon solvents, aromatic hydrocarbon solvents, ether solvents and alcohol solvents. A defoaming agent in the form of a powder can be prepared from the inventive silicone oil compound borne on a powder carrier such as methyl cellulose, polyvinyl alcohol, lactose, dextrin, hydrophilic fine powder of silica and starch. It is also possible that the inventive silicone oil compound is used as a defoaming agent in a solid form obtained by compounding the oil compound with a surface active agent or a water-soluble wax which is solid at room temperature. The amount of the above mentioned various types of the defoaming agents to be added to a foaming liquid is, though dependent on the nature of the foaming liquid, conditions of the defoaming treatment and other factors, usually in the range from 1 to several hundreds ppm by weight calculated as the inventive silicone oil compound contained in the respective forms of the defoaming agent.

In the following, the silicone oil compound of the invention is illustrated in more detail by way of Examples and Comparative Examples, which, however, never limit the scope of the invention in any way. In the following description, the values of the viscosity are all those obtained by the measurement at 25° C. The defoaming compositions prepared in the following Examples and Comparative Examples were evaluated for the following items by the testing procedures given there.

(1) Sustainability test of defoaming activity-1

A 100 g portion of the silicone oil compound under testing was admixed with 150 g of a polyoxyalkylene-modified silicone oil having a viscosity of 1400 centistokes and expressed by the formula $G_{0.1}Me_{2.0}SiO_{0.95}$, in which Me is a methyl group and G is a polyoxyalkylene group of the formula $-C_3H_6O(C_2H_4O)_{25}C_4H_9$, and the mixture was uniformly mixed at room temperature by using a mixer to give a self-emulsifiable defoaming composition. Separately, 50 g of a 1% aqueous solution of polyoxyethylene sorbitan monooleate (Rheodol Super TW-O120, a product by Kao Co.) were taken in a glass bottle of 150 ml capacity which was hermetically stoppered after addition of 0.1 ml of a 10% aqueous dispersion of the above prepared self-emulsifiable defoaming agent and mounted on a shaking machine to be shaken for 1 minute at a frequency of 250 shakes/minute, immediately after setting and 2 hours, 5 hours, 10 hours and 24 hours thereafter, to determine the length of time in seconds from termination of shaking to the disappearance of foams.

(2) Stability test by dilution-1

A 100 g portion of a 5% aqueous dispersion of the self-emulsifiable defoaming composition prepared in the test (1) above was taken in a beaker of 300 ml capacity and, after standing for 24 hours at 25° C., the appearance of the liquid in the beaker was visually inspected and recorded in three ratings of A, B and C according to the following criteria.

A: good condition of the emulsion without oil separation or settling of silica particles B: slight oil separation or settling of silica particles C: heavy oil separation and settling of silica particles (3) Sustainability test of defoaming activity-2

A 100 g portion of the oil compound was mixed at 60 to 70° C. with 20 g of sorbitan monostearate (Nonion SP-60R, a product by Nippon Oil and Fat Co.), 20 g of polyoxyethylene cetyl ether (Nikkol BC-30TX, a product by Nikko Chemicals Co.) and 20 g of polypropyleneglycol (Uniol D-4000, a product by Nippon Oil and Fat Co.) and then, under gradual addition of 840 g of water, agitated and emulsified for about 20 minutes with a homomixer to give an emulsion-type defoaming composition. In the next place, 100 g of a 0.2% aqueous solution of sodium oleate were taken in a 1-liter measuring cylinder and, after addition of 1.0 g of a diluted aqueous emulsion containing 10% of the above prepared emulsion-type defoaming composition, air bubbling was conducted into the liquid in the measuring cylinder at a rate of 1 liter/minute through a sintered glass diffuser to record the total volume of the liquid and foams after 1 minute, 5 minutes, 10 minutes, 15 minutes and 20 minutes of air bubbling.

(4) Stability test by dilution-2

A 200 g portion of the diluted liquid containing 10% of the emulsion-type defoaming composition prepared in the test (3) above was taken in a beaker of 300 ml capacity and, after agitation for 3 minutes with a homomixer rotating at 5000 rpm, the appearance of the liquid in the beaker was visually inspected and recorded in three ratings of A, B and C according to the following criteria.

A: good condition of the emulsion without oil separation or settling of silica particles B: slight oil separation or settling of silica particles C: heavy oil separation and settling of silica particles

EXAMPLE 1

Into a glass flask of 2 liter capacity having a separable cover equipped with a stirrer, thermometer, reflux condenser and gas inlet tube were taken 850 g of an α,ω-dihydroxy dimethyl polysiloxane having a viscosity of 1000 centistokes and expressed by the formula $$HO-(-SiMe_2-O-)_{230}-H,$$

in which Me is a methyl group, as the component (A), 50 g of a 1,1,1,3,5,7,7,7-octamethyl-3,5-dihydroxy tetrasiloxane expressed by the formula $$Me_3Si-O-[-Si(OH)Me-O-]_2-SiMe_3,$$

in which Me is a methyl group, as the component (B) and 100 g of a finely divided silica filler having a specific surface area of 300 m²/g (Nipsil HD-2, a product by Nippon Silica Co.) as the component (C) and they were mixed together for 3 hours at 150° C. under a nitrogen gas stream to give a silicone oil compound A having a viscosity of 2800 centistokes.

The results of the evaluation tests are shown in Table 1 given below.

EXAMPLE 2

A silicone oil compound, referred to as the compound B hereinafter, having a viscosity of 6700 centistokes was prepared in the same formulation and in the same manner as in Example 1 described above excepting for the replacement of the α,ω-dihydroxy dimethyl polysiloxane having a viscosity of 1000 centistokes as the component (A) with the same amount of another α,ω-dihydroxy dimethyl polysiloxane having a viscosity of 3000 centistokes and expressed by the formula $$HO-(-SiMe_2-O-)_{350}-H,$$

in which Me is a methyl group.

The results of the evaluation tests of the compound B are shown in Table 1 given below.

EXAMPLE 3

A silicone oil compound, referred to as the compound C hereinafter, having a viscosity of 2500 centistokes was prepared in the same formulation and in the same procedure as in Example 1 described above excepting for an increase in the amount of the component (A) from 850 g to 880 g and a decrease in the amount of the component (B) from 50 g to 20g.

The results of the evaluation tests of the compound C are shown in Table 1 given below.

EXAMPLE 4

A silicone oil compound, referred to as the compound D hereinafter, having a viscosity of 7800 centistokes was prepared in the same manner as in Example 1 described above excepting for the replacement of the silica powder Nipsil HD-2 with the same amount of another silica powder having a specific surface area of 200 m²/g (Aerosil 200, a product by Nippon Aerosil Co.).

The results of the evaluation tests of the compound D are shown in Table 1 given below.

EXAMPLE 5

A silicone oil compound, referred to as the compound E hereinafter, having a viscosity of 5000 centistokes was prepared in the same manner as in Example 1 described above from 780 g of another α,ω-dihydroxy dimethyl polysiloxane having a viscosity of 700 centistokes and expressed by the formula $$HO-(-SiMe_2-O-)_{190}-H$$

in which Me is a methyl group, 70 g of the same component (B) and 150 g of the same component (C).

The results of the evaluation tests of the compound E are shown in Table 1 given below.

COMPARATIVE EXAMPLE 1

A silicone oil compound, referred to as the compound F hereinafter, having a viscosity of 9800 centistokes was prepared in the same manner as in Example 1 described above excepting for an increase in the amount of the component (A) from 850 g to 900 g and omission of the component (B).

The results of the evaluation tests of the compound F are shown in Table 1 given below.

COMPARATIVE EXAMPLE 2

A silicone oil compound, referred to as the compound G hereinafter, having a viscosity of 6900 centistokes was prepared in the same manner as in Example 1 described above excepting for a decrease in the amount of the component (A) from 850 g to 650 g and an increase in the amount of the component (B) from 50 g to 250 g.

The results of the evaluation tests of the compound G are shown in Table 1 given below.

COMPARATIVE EXAMPLE 3

A silicone oil compound, referred to as the compound H hereinafter, having a viscosity of 6300 centistokes was prepared in the same manner as in Example 1 described above excepting for the replacement of the component (B) with the same amount of an organopolysiloxane resin consisting of $Me_3SiO_{1/2}$ units and $SiO_{4/2}$ units in a molar ratio of 0.85:1.

The results of the evaluation tests of the compound H are shown in Table 1 given below.

COMPARATIVE EXAMPLE 4

A silicone oil compound, referred to as the compound I hereinafter, having a viscosity of 12500 centistokes was prepared in the same manner as in Example 1 described above excepting for the replacement of the component (A) with the same amount of a dimethyl silicone oil, i.e. α,ω-di(trimethylsiloxy) dimethyl polysiloxane, having a viscosity of 1000 centistokes (KF 96, a product by Shin-Etsu Chemical Co.).

The results of the evaluation tests of the compound I are shown in Table 1 given below.

COMPARATIVE EXAMPLE 5

A silicone oil compound, referred to as the compound J hereinafter, having a viscosity of 57000 centistokes was prepared in the same manner as in Example 1 described above excepting for an increase in the amount of the component (A) from 850 g to 900 g, omission of the component (B) and replacement of the silica powder as the component (C) with the same amount of another silica powder Aerosil 200 (see Example 4) after a hydrophobilizing treatment with hexamethyl disilazane.

The results of the evaluation tests of the compound J are shown in Table 1 given below.

TABLE 1

| Compound | Test (1), seconds, after standing of | | | | | Test (3), ml, after bubbling for | | | | | Test (2) | Test (4) |
|---|---|---|---|---|---|---|---|---|---|---|---|---|
| | as added | 2 hrs. | 5 hrs. | 10 hrs. | 24 hrs. | 1 min. | 5 mins. | 10 mins. | 15 mins. | 20 mins. | | |
| A | 4 | 7 | 8 | 16 | 20 | 130 | 150 | 170 | 180 | 200 | A | A |
| B | 3 | 4 | 7 | 10 | 12 | 130 | 130 | 130 | 140 | 140 | A | A |
| C | 5 | 8 | 12 | 19 | 26 | 130 | 140 | 180 | 210 | 250 | A | A |
| D | 5 | 8 | 10 | 16 | 22 | 130 | 140 | 140 | 150 | 160 | A | A |
| E | 6 | 11 | 13 | 18 | 28 | 140 | 140 | 150 | 200 | 230 | A | A |
| F | 32 | >300 | — | — | — | 780 | >1000 | — | — | — | C | C |
| G | 15 | 23 | 45 | >300 | — | 250 | 440 | 950 | >1000 | — | C | C |
| H | 24 | 50 | >300 | — | — | 330 | 820 | >1000 | — | — | B | C |
| I | 7 | 9 | 13 | 20 | 26 | 150 | 160 | 180 | 220 | 250 | C | C |
| J | 20 | 43 | 125 | 280 | >300 | 190 | 350 | 770 | >1000 | — | B | C |

What is claimed is:

1. A silicone-based oil compound which comprises, as a uniform blend:

(A) from 30 to 98.9% by weight of an α,ω-dihydroxy diorganopolysiloxane having a viscosity in the range from 10 to 1,000,000 centistokes at 25° C. represented by the general formula $$HO-(-SiR_2-O-)_m-H,$$

in which each R is, independently from the others, an unsubstituted or substituted monovalent hydrocarbon group having 1 to 20 carbon atoms and the subscript m is a positive number having an average value in the range from 10 to 3000;

(B) from 0.1 to 20% by weight of a poly(organohydroxy siloxane) represented by the general formula $$R^1_3Si-O-[-Si(OH)R^1-O-]_n-SiR^1_3,$$

in which each $R^1$ is, independently from the others, an unsubstituted or substituted monovalent hydrocarbon group having 1 to 20 carbon atoms and the subscript n is a positive integer in the range from 1 to 10; and (C) from 1 to 50% by weight of a finely divided silica powder having a specific surface area of at least 100 $m^2/g$, the total amount of the components (A), (B) and (C) being 100% by weight.

2. The silicone-based oil compound as claimed in claim 1 in which the subscript m in the general formula representing the component (A) is a positive number having an average value in the range from 50 to 1000.

3. The silicone-based oil compound as claimed in claim 1 in which at least 90% of the groups denoted by R in the general formula representing the component (A) are methyl groups.

4. The silicone-based oil compound as claimed in claim 1 in which the subscript n in the general formula representing the component (B) is a positive integer in the range from 2 to 5.

5. The silicone-based oil compound as claimed in claim 4 in which the subscript n in the general formula representing the component (B) is 2.

6. The silicone-based oil compound as claimed in claim 1 in which the groups denoted by $R^1$ in the general formula representing the component (B) are methyl groups.

7. The silicone-based oil compound as claimed in claim 2 in which the amount of the component (A) is in the range from 50 to 95% by weight.

8. The silicone-based oil compound as claimed in claim 1 in which the amount of the component (B) is in the range from 1 to 10% by weight.

9. The silicone-based oil compound as claimed in claim 1 in which the amount of the component (C) is in the range from 5 to 30% by weight.

10. The silicone-based oil compound of claim 1, wherein, in the α,ω-dihydroxy diorganopolysiloxane, (A), each R is independently an alkyl, alkenyl, phenyl, tolyl, naphthyl, 2-phenylethyl or 2-methyl-2-phenylethyl group, each optionally substituted by halogen, cyano, amino, mercapto, epoxy or (meth)acryloxy groups.

11. The silicone-based oil compound of claim 1, wherein any remaining R groups are phenyl.

12. The silicone-based oil compound of claim 1, wherein component (A) has a viscosity from 100 to 100,000 centistokes.

13. The silicone-based oil compound of claim 1, wherein, in the poly(organohydroxy siloxane), (B), each $R^1$ is independently an alkyl, alkenyl, phenyl, tolyl, naphthyl, 2-phenylethyl or 2-methyl-2-phenylethyl group, each optionally substituted by halogen, cyano, amino, mercapto, epoxy or (meth)acryloxy groups.

14. The silicone-based oil compound of claim 6, wherein any remaining $R^1$ groups are phenyl.

15. The silicone-based oil compound of claim 1, wherein the finely divided silica powder, (C), is a precipitated silica powder, fumed silica powder or silica xerogel.

16. The silicone-based oil compound of claim 1, wherein the finely divided silica powder, (C), is pre-treated with an organosilyl group-containing compound for hydrophobilization.

17. The silicone-based oil compound of claim 1, wherein the finely divided silica powder, (C), has a specific surface area of at least 200 $m^2/g$.

* * * * *